US005679293A

United States Patent [19]

Cowley

[11] Patent Number: 5,679,293
[45] Date of Patent: Oct. 21, 1997

[54] METHOD OF MAKING EXTRUDATE BLANKS

[75] Inventor: Richard Charles Cowley, Ely, United Kingdom

[73] Assignee: Barwell International Limited, United Kingdom

[21] Appl. No.: 546,098

[22] Filed: Oct. 20, 1995

Related U.S. Application Data

[62] Division of Ser. No. 432,685, May 2, 1995, Pat. No. 5,486,104, which is a continuation of Ser. No. 144,761, Oct. 28, 1993, abandoned.

[30] Foreign Application Priority Data

Oct. 29, 1992 [GB] United Kingdom ..................... 9222751
Jul. 19, 1993 [GB] United Kingdom ..................... 9314904

[51] Int. Cl.[6] ................................................ B29C 47/92
[52] U.S. Cl. .......................... 264/40.1; 264/40.5; 264/40.7; 264/148; 425/142
[58] Field of Search .......................... 264/40.1, 40.5, 264/40.7, 141, 142, 148; 425/142, 145

[56] References Cited

U.S. PATENT DOCUMENTS

| 4,240,997 | 12/1980 | Jex | 425/145 |
|---|---|---|---|
| 4,430,282 | 2/1984 | Stack | 264/323 |
| 4,537,737 | 8/1985 | Crowe | 264/148 |
| 4,565,512 | 1/1986 | Wills et al. | 264/142 |
| 4,585,600 | 4/1986 | Rollyson et al. | 264/148 |
| 4,719,808 | 1/1988 | Baumann |  |
| 4,850,839 | 7/1989 | Cowley |  |
| 4,935,179 | 6/1990 | Kato et al. | 264/40.1 |
| 5,169,649 | 12/1992 | Sikora |  |
| 5,197,633 | 3/1993 | Hines et al. | 264/148 |
| 5,252,054 | 10/1993 | Ehnert et al. | 264/148 |
| 5,344,299 | 9/1994 | Takeuchi | 264/148 |

FOREIGN PATENT DOCUMENTS

| 0108185 | 5/1984 | European Pat. Off. . |  |
| 0302602 | 2/1989 | European Pat. Off. . |  |
| 0107778 | 9/1991 | European Pat. Off. . |  |
| 2941722 | 5/1981 | Germany | 264/40.1 |
| 2-107407 | 4/1990 | Japan . |  |
| 1141033 | 1/1969 | United Kingdom . |  |
| 2063516 | 6/1981 | United Kingdom | 264/40.1 |

OTHER PUBLICATIONS

Anthony Crowe AG Machines Operating Manual –Economy E 40/Manual Operations, Mar. 1990.

Primary Examiner—Jeffery R. Thurlow
Attorney, Agent, or Firm—Baker & Daniels

[57] ABSTRACT

A hydraulic ram operated extruder having an extrusion die from which an extradate is delivered and a motor driven cutter at the die to sever the extrudate repeatedly to produce individual pieces of extradate. The hydraulic fluid circuit including a pump and control valves delivers hydraulic fluid to the ram of the extruder at a substantially constant volume flow rate. A control device responsive to the speed of advance of the ram in the extruder controls the motor which drives the cutter to produce blanks of substantially equal volume.

7 Claims, 8 Drawing Sheets

FIG. 1.

PRIOR ART

METHOD OF MAKING EXTRUDATE BLANKS

This is a division of application Ser. No. 08/432,685, filed May 2, 1995, now U.S. Pat. No. 5,486,104 which is a continuation of application Ser. No. 08/144,761, filed Oct. 28, 1993, now abandoned.

BACKGROUND TO THE INVENTION

1. Field of the Invention

This invention relates to hydraulic ram operated extruders for producing pieces of extrudate of substantially the same size.

2. Background Prior Art

A particular application of such apparatus is the production of blanks or "pre-forms" of rubber or similar elastomeric material for subsequent moulding in compression moulds. In such processes, it is preferable for all blanks presented to a given mould to be of exactly the same volume so as to eliminate or reduce to a minimum wastage of material, or the production of rejects in the case where undersized blanks are supplied. However rubber or rubber-like compounds have a tendency to "recover", that is shrink in the longitudinal direction after extruding with the result that the cross-sectional area may increase by up to 100% or more when leaving the extrusion die. This shrinking in length and increase in cross-sectional area may not be uniform along the length of the extrudate and thus, when cut into pieces of equal length, the pieces may be of different volume due to these variations in cross-sectional areas.

Our U.K. Patent No. 1,141,033 was directed to an improved form of hydraulic ram extruder to overcome the above difficulties by producing pieces of extrudate of substantially equal volume, the extruder having a hydraulic ram the plunger of which was arranged to apply pressure to the material to be extruded and valve means were provided for controlling and maintaining a substantially constant rate at which the fluid was supplied to the hydraulic ram. The ram had a die-shape to extrude the material in the form of a continuous length of appropriate cross-sectional shape and cutting means were arranged to sweep across the outlet of the die at equal time intervals to sever the extrudate into pieces of equal volume. Although the extruder had a valve arrangement for metering hydraulic fluid to the hydraulic ram aimed to provide fluid at a constant volume flow-rate to ensure that the ram-extruded material from the die at a constant volume flow-rate, small inaccuracies in the volume of the blanks produced still arise.

It is an object of the present invention to further improve the accuracy of blank forming in a hydraulic ram operated extruder.

SUMMARY OF THE INVENTION

This invention provides a hydraulic ram operated extruder having an extrusion die from which an extrudate is delivered, cutter means at the die to sever the extrudate repeatedly to produce individual pieces of extrudate, means to deliver hydraulic fluid to the ram of the extruder at a substantially constant volume flow-rate and a control means responsive to the speed of advance of the ram in the extruder for controlling the cutter means to produce blanks of substantially equal volume.

Preferably the control means includes means to determine and store a control ratio equal to the ratio of the cutter speed to the ram velocity and has means for varying the control ratio to allow blanks of a predetermined volume to be produced.

Further the control means may comprise a microprocessor for controlling the speed of a variable speed cutter means in relation to the speed of the ram to produce blanks of the requisite volume.

By way of example, the means to determine the speed of the ram may comprise a linear transducer responsive to movement of the ram.

In accordance with a further feature of present invention, a screw extruder is connected to the hydraulic ram extruder adjacent to the die for charging the cylinder of the ram extruder with material to be extruded and for causing the ram of the extruder to retract as the cylinder is filled. Thus, the cylinder of the ram extruder is prefilled with a charge of extrudate free of air prior to an extrusion operation.

BRIEF DESCRIPTION OF THE DRAWINGS

The following is a description of some specific embodiments of the invention reference being made to the accompanying drawings in which.

DESCRIPTION OF THE PREFERRED EMBODIMENTS

Figure 1:
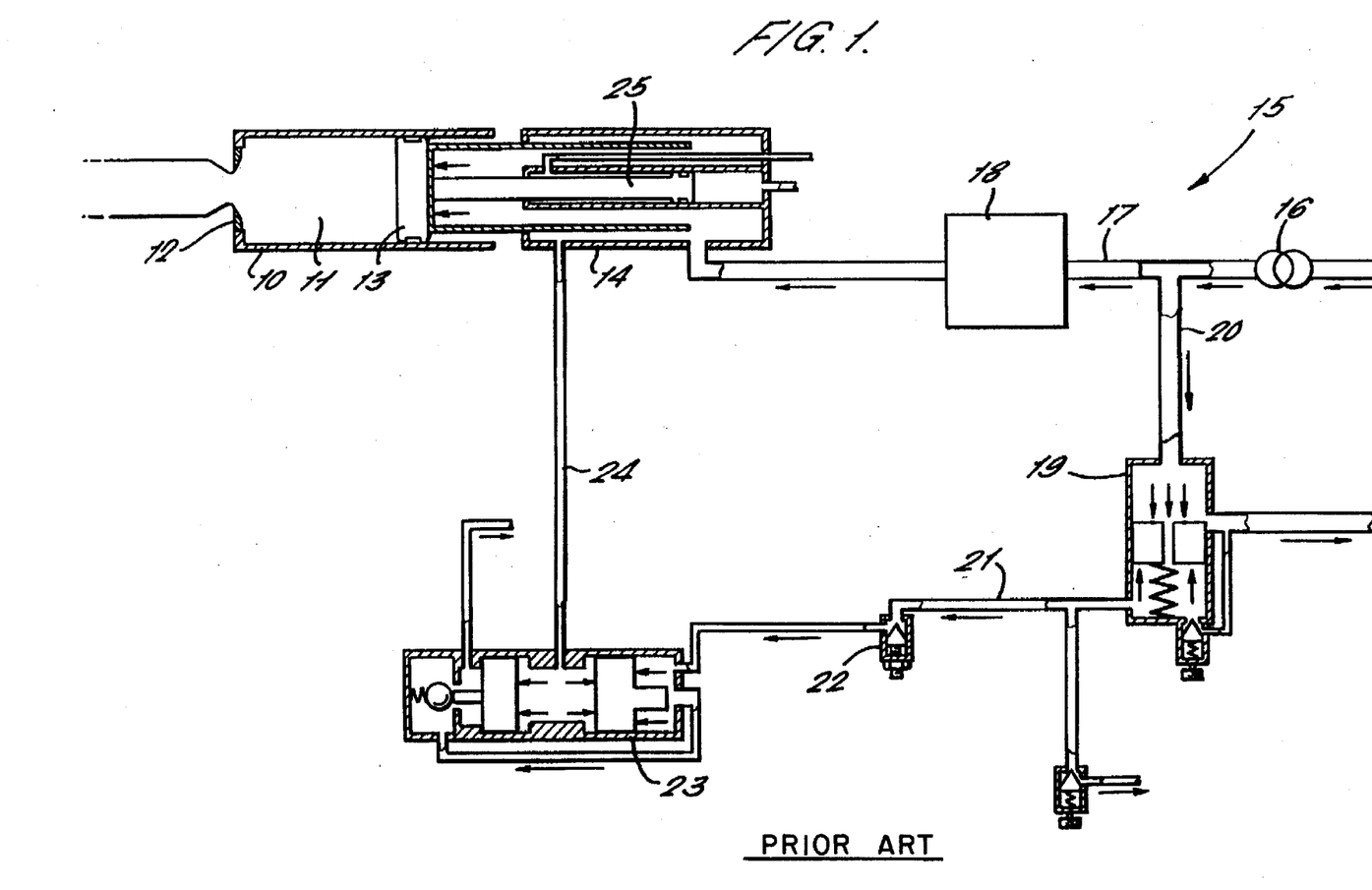
FIG. 1 is a diagrammatic illustration of a hydraulic ram extruder of a known type for producing blanks of substantially equal volume.

Referring firstly to FIG. 1 of the drawings, there is shown a hydraulic ram extruder of the form described and illustrated in our U.K. Patent No. 1141033 to which reference should be made for a detailed description. Briefly, the extruder comprises an extrusion cylinder 10 which is charged with rubber or other elastomeric material 11 to be extruded. An extrusion die 12 is mounted at one end of the cylinder 10 to extrude the elastomeric material with a required cross-section and a ram 13 projecting from a hydraulic cylinder 14 extends into the other end of the cylinder to pressurise the elastomeric material therein. The cylinder 14 is connected in a hydraulic circuit illustrated generally at 15 and comprises a pump 16 which draws oil from an oil dank (not shown) and supplies a fluid line 17 connected through a volume control 18 which governs the volume flow-rate of the oil to the cylinder 14 to extend the ram. Because the volume control supplies hydraulic fluid to the cylinder at a constant flow-rate, the ram advances at a constant flow-rate to extrude compound from the extrusion cylinder through the die at a constant volume flow-rate.

In order to achieved constant volume flow-rate to the cylinder, a constant pressure difference is maintained across the volume control valve 18 and this is achieved by a pump pressure controller and relief valve 19 connected in a branch 20 extending from the fluid line 17 between pumps 16 and volume controller 18. The pump pressure controller has a spring loaded sliding valve which enables surplus oil to be dumped. A bleed line 21 extends from the pressure controller via a preset differential valve 22 to a differential valve 23. The differential valve 23 has a sliding piston which controls the bleed from the pump pressure controller by sensing the pressure in the hydraulic cylinder via line 24. When pressure in the hydraulic cylinder drops, the sliding piston allows the bleed to escape more easier, thereby permitting the pump pressure controller to dump more oil and thus lowering the pressure on the inlet side of the volume control. By maintaining the pressure difference across the volume control, a constant volume flow-rate of oil is fed to the hydraulic cylinder and, in turn, a constant volume flow-rate of compound is extruded regardless of pressure variation. The differential valve also incorporates a spring-loaded bleed check valve which blocks the bleed line when pressure is required for "forward" and "retract" movement of the ram and there is no pressure in the hydraulic cylinder.

The preset differential valve 22 ensures that bleed line pressure to the differential valve 23 is lower than that in the pump pressure controller. This regulates the amount by which the pump pressure is higher than the volume control outlet pressure, i.e. the pressure in the hydraulic cylinder.

The hydraulic cylinder 14 has an inner double-acting piston/cylinder arrangement indicated generally at 25 or effecting fast-forward movement of the ram to pre-pressurise the compound 11 in the extrusion cylinder and for retraction of the ram.

Reference should be made to our U.K. Patent No. 1,141,033 for further details of the hydraulic circuit and its operation.

A motor driven cutter 48, 49 is provided at the extrusion die to sweep across the outlet of the die at equal time intervals to sever the extrude into pieces of substantially equal volume. Notwithstanding the arrangements provided for metering hydraulic fluid to the ram at a constant volume flow-rate and the motor driven cutter for severing the extrudate at equal time intervals, there was a variation in blank size of +/-1.5% and the purpose of the present invention is to provide even greater accuracy.

Referring now to FIGS. 2 to 6 of the accompanying drawings, an embodiment of the hydraulic ram extruder in accordance with the present invention is illustrated and for the sake of convenience, like parts have been allotted the same reference numerals.

The extruder is controlled through a microprocessor controlled system indicated generally at 40 having a main processor 41 which controls the various functions of the extruder and receives input signals from relays, contacters, limit switches, solenoids, reed switches and transducers located at appropriate stations in the apparatus. A PLC may be incorporated to the electrical control cabinet to provide automatic operation for the main machine functions outside of the control algorithm. Processor 41 is coupled to a PC for providing audit trail and set-up data indicated at 42, a printer 43 for printing audit trail and set-up data and a keyboard/ screen 44 for communicating and displaying all control functions to and from the processor and the PLC referred to above.

The volume flow control system of our previous apparatus is replaced by a proportional flow valve 45 set by the main processor 41 to a stored setting achieved during test running to produce a desired blank. The processor may also store the pressure at which the valve is switched. The valve in conjunction with the differential value as used previously control the basic ram velocity and hydraulic extrusion pressure. Hydraulic pressure in the circuit is measured via a pressure transducer 46 having an input to the main processor.

Figure 2:
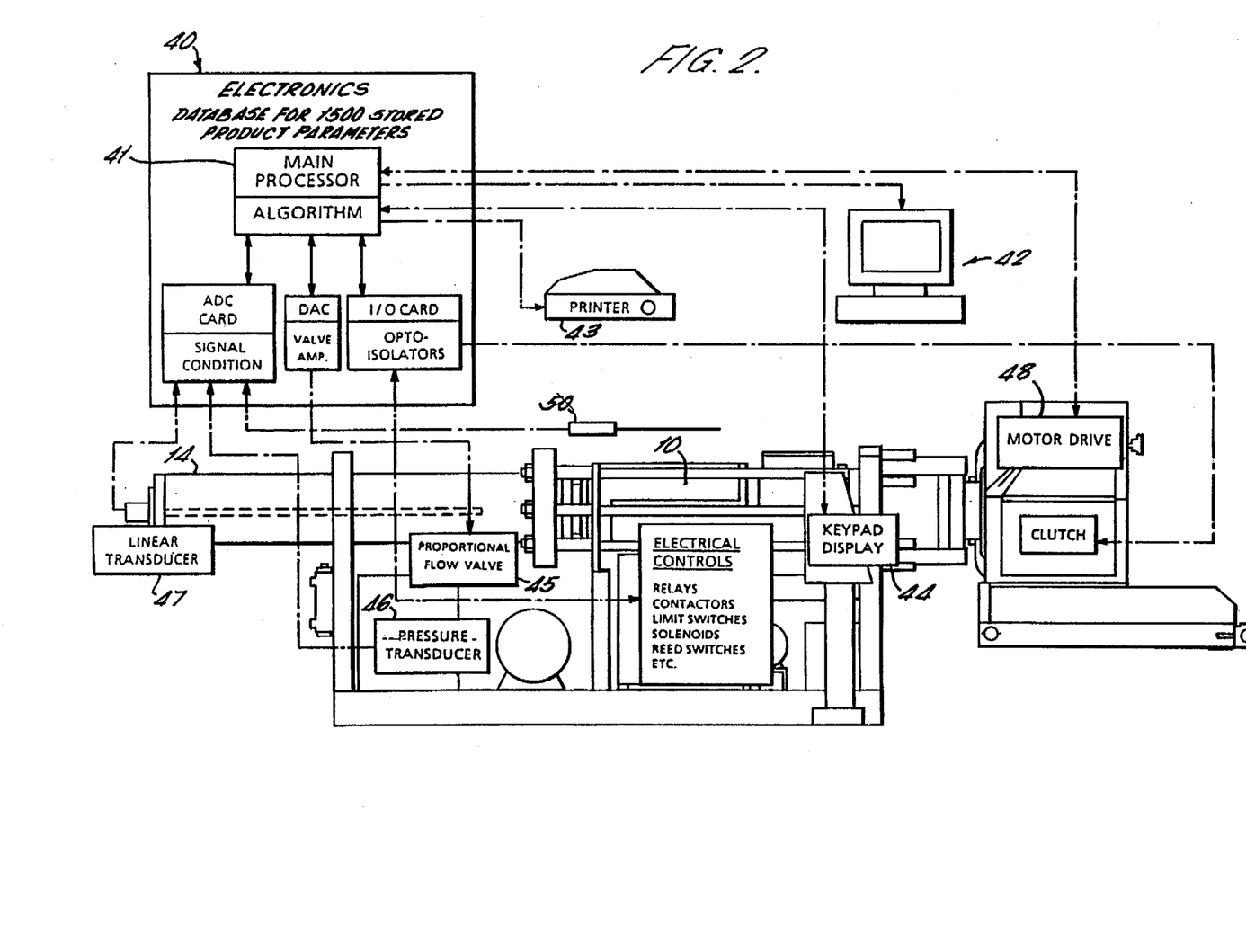
FIG. 2 is a diagrammatic illustration of a hydraulic ram extruder for producing blanks of equal volume in accordance with the present invention.
Figure 3:
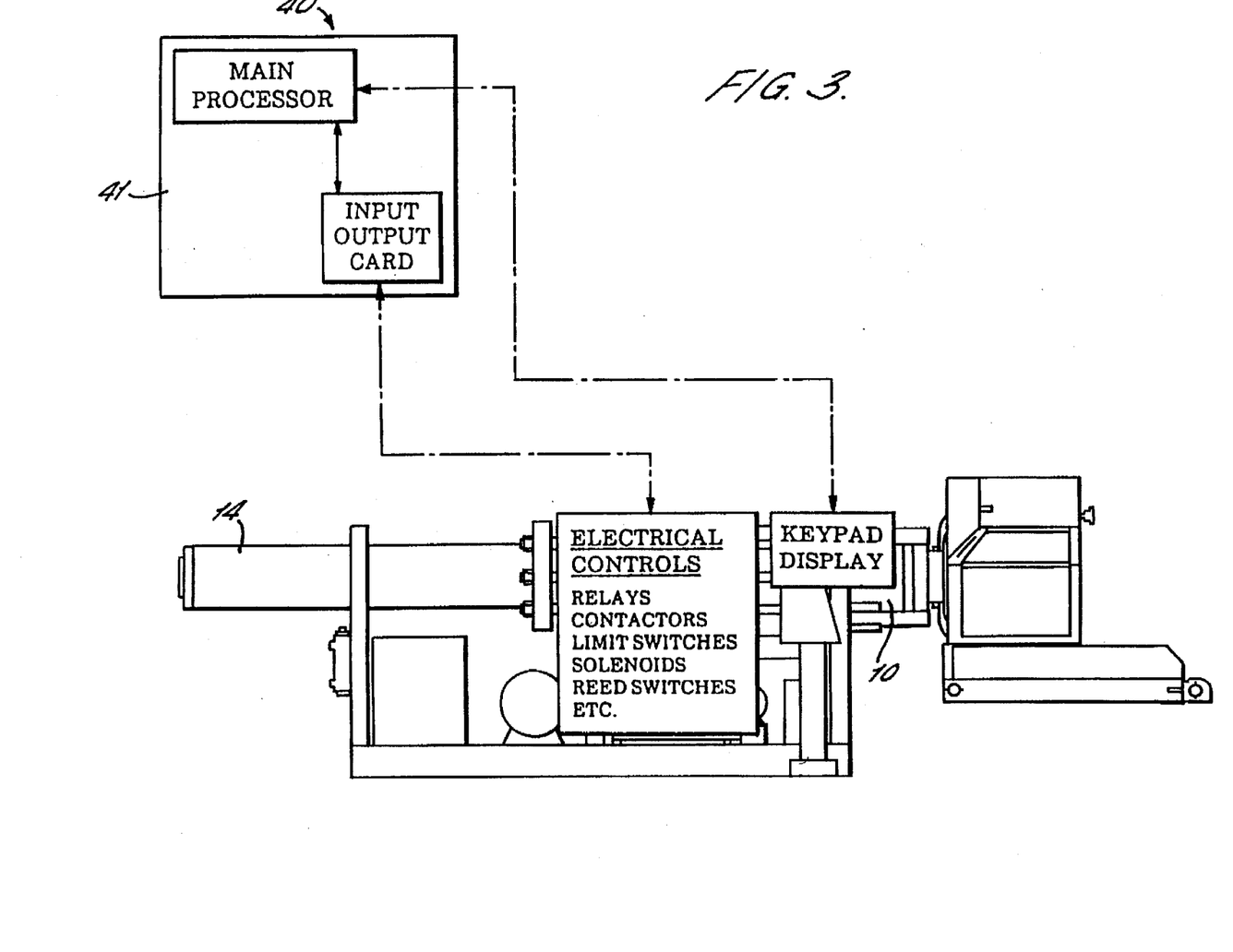
FIG. 3 is a similar view to FIG. 2 highlighting the main processor control.
Figure 4:
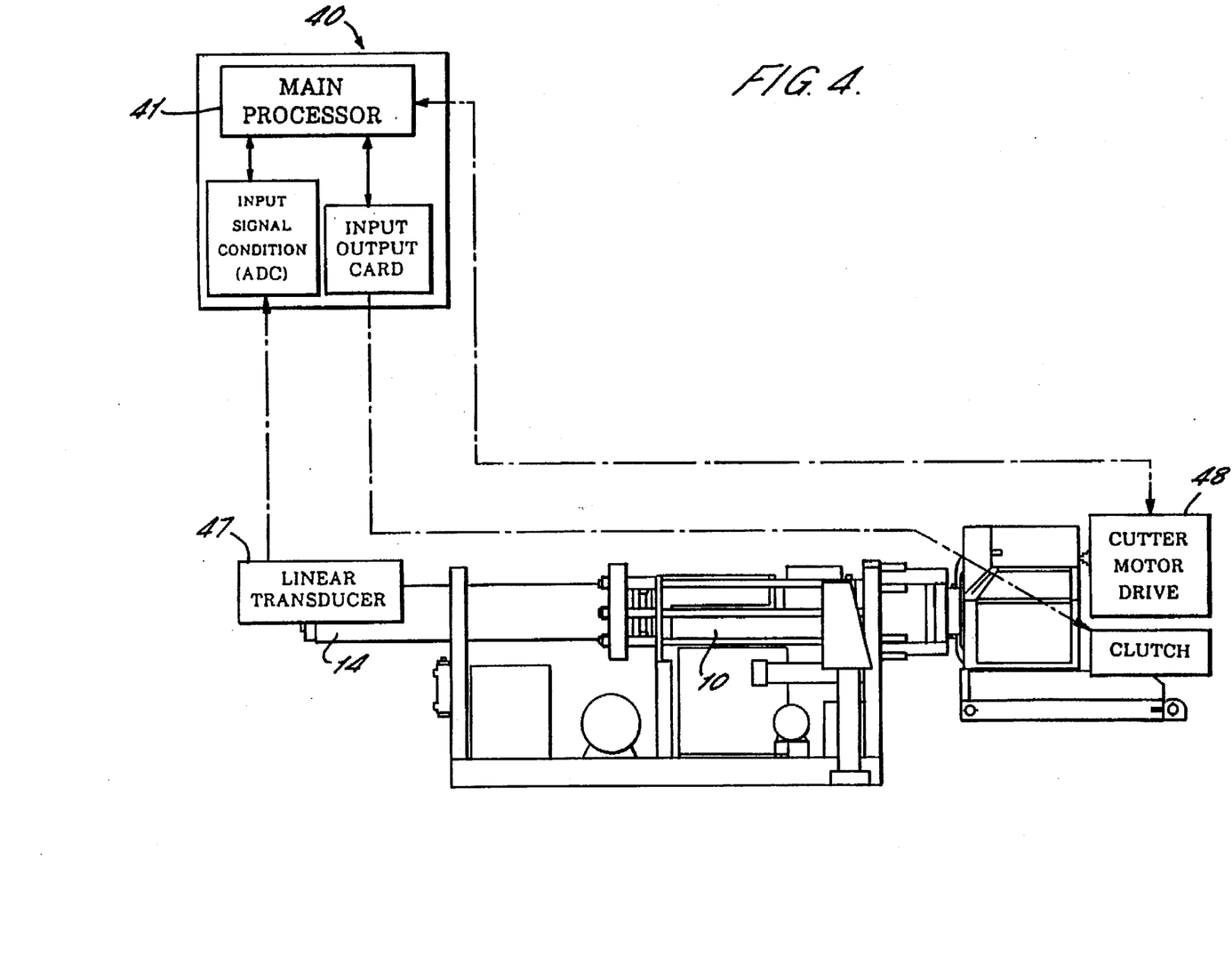
FIG. 4 is a similar view to FIG. 2 highlighting the linear transducer/cutter control for the extruder.

Linear transducer 47 is associated with the hydraulic ram and relays measured ram movement to the main processor 41 which in turn calculates current ram velocity.

The cutter 49 for severing the extrudate delivered from the die of the extruder is a rotary cutter driven by a variable speed servo motor 48. The motor has a two-speed clutch which automatically engages "H" or "L" in a gearbox for high and low speed ranges and varying torque. The speed control for the servo motor is controlled by the main processor 41 to vary the cutter speed as required.

The main processor calculates the ram velocity by sensing linear transducer displacement. A control algorithm then synchronises the ram velocity and cutter. Speed to maintain a given blank weight by applying the formula:

cutter speed=control ratio×ram velocity.

Figure 5:
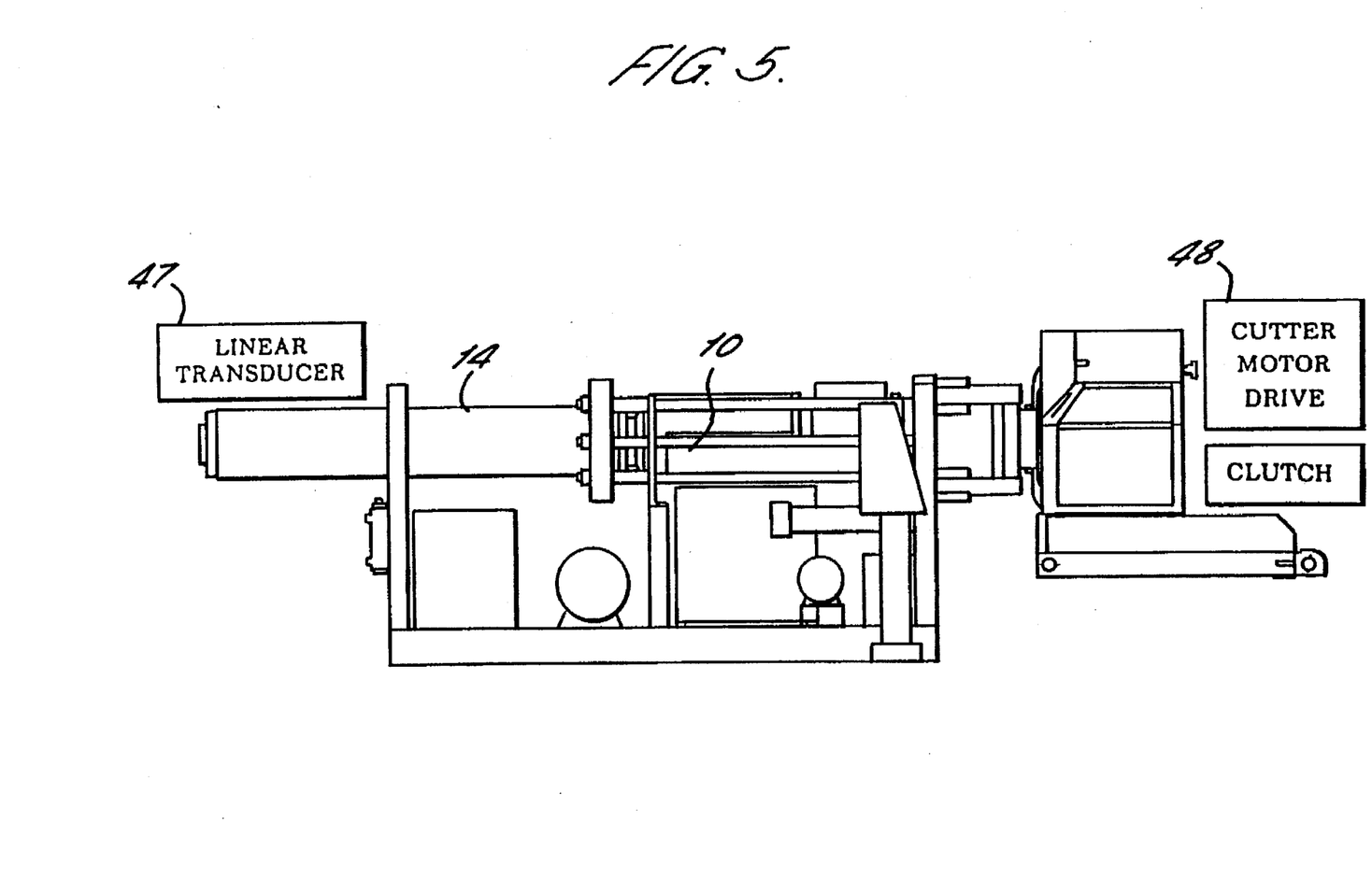
FIG. 5 is a similar view to FIG. 2, highlighting the blank weight controls.

The control ratio is determined and stored in the product set-up parameters by initially "test running" the desired blank. Consequently different blank weights will result as the control ratio is varied.

Thus once a control ratio for a particular blank has been determined, the appropriate set-up parameters can be recalled into the control system using the key pad and the apparatus set in operation. The linear transducer 47 monitors the ram speed and any variation in speed will result in a re-calculation of the required cutter speed for the control ratio for that blank by the main processor. An appropriate signal to increase or lower the cutter speed is given from the main processor to the motor drive for the cutter to increase or decrease the intervals between successive severings of the extrudate as appropriate to maintain the required blank volume.

Figure 6:
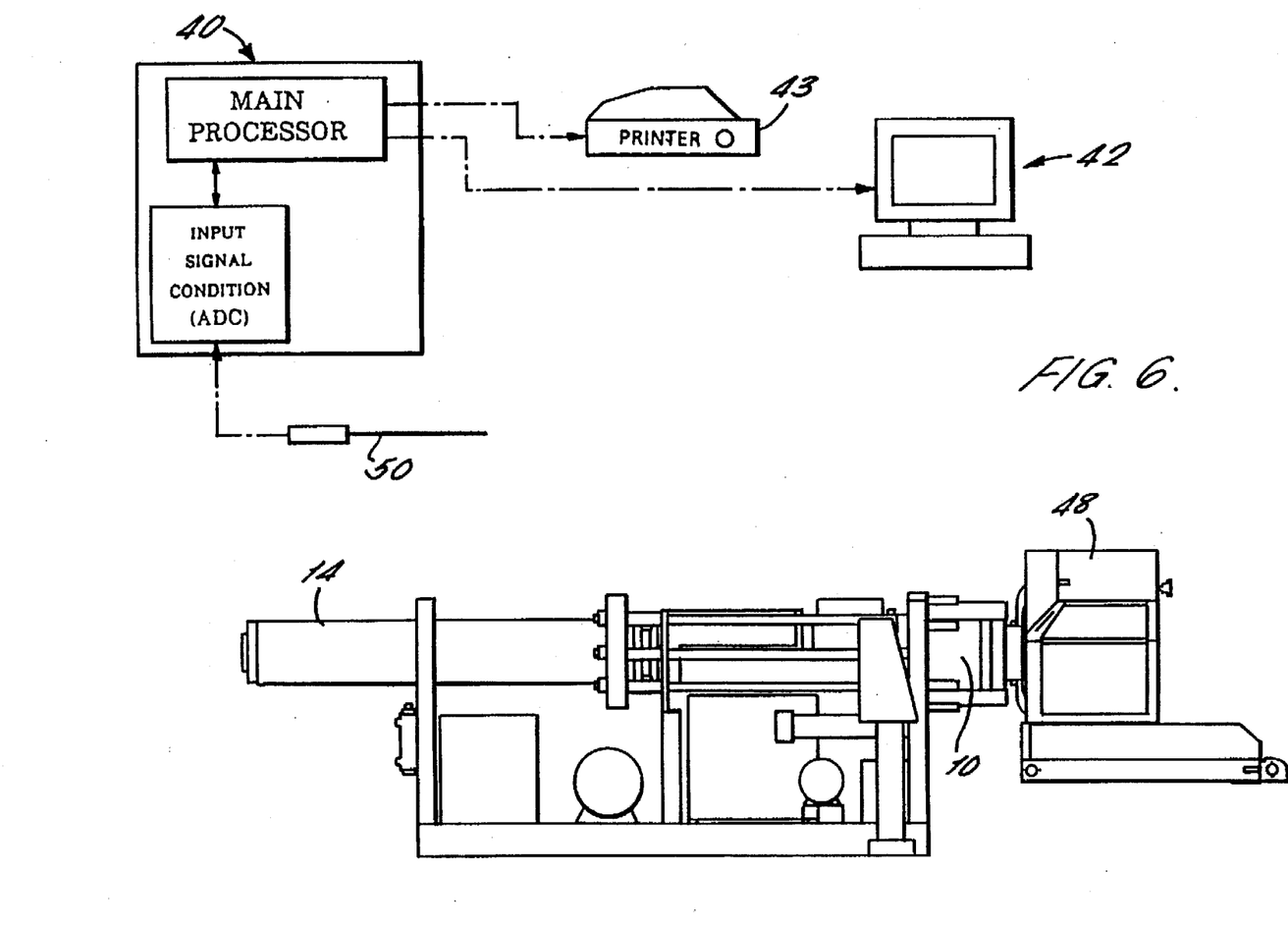
FIG. 6 is a similar view to FIG. 2, highlighting a pig temperature probe.

Further features of the apparatus comprise a pig temperature probe 50 which is connected to the processor to measure compound temperature for display on the audit trail readout and keypad screen.

FIGS. 3 to 6 of the drawings are simplified versions of the main elements of the apparatus as shown in FIG. 2.

With the new apparatus described above a volume accuracy of +/-0.5% is achieved.

Further features which may be provided are as follows:

The facility, using a P.C., to save all database information to disc (i.e set up parameters, audit trail, etc.) and then retrieve and re-load back to the main processor when required.

Screen prompted diagnostics for machine fault-finding.

Screen display in English, French, German, Italian and Spanish languages.

Figure 7:
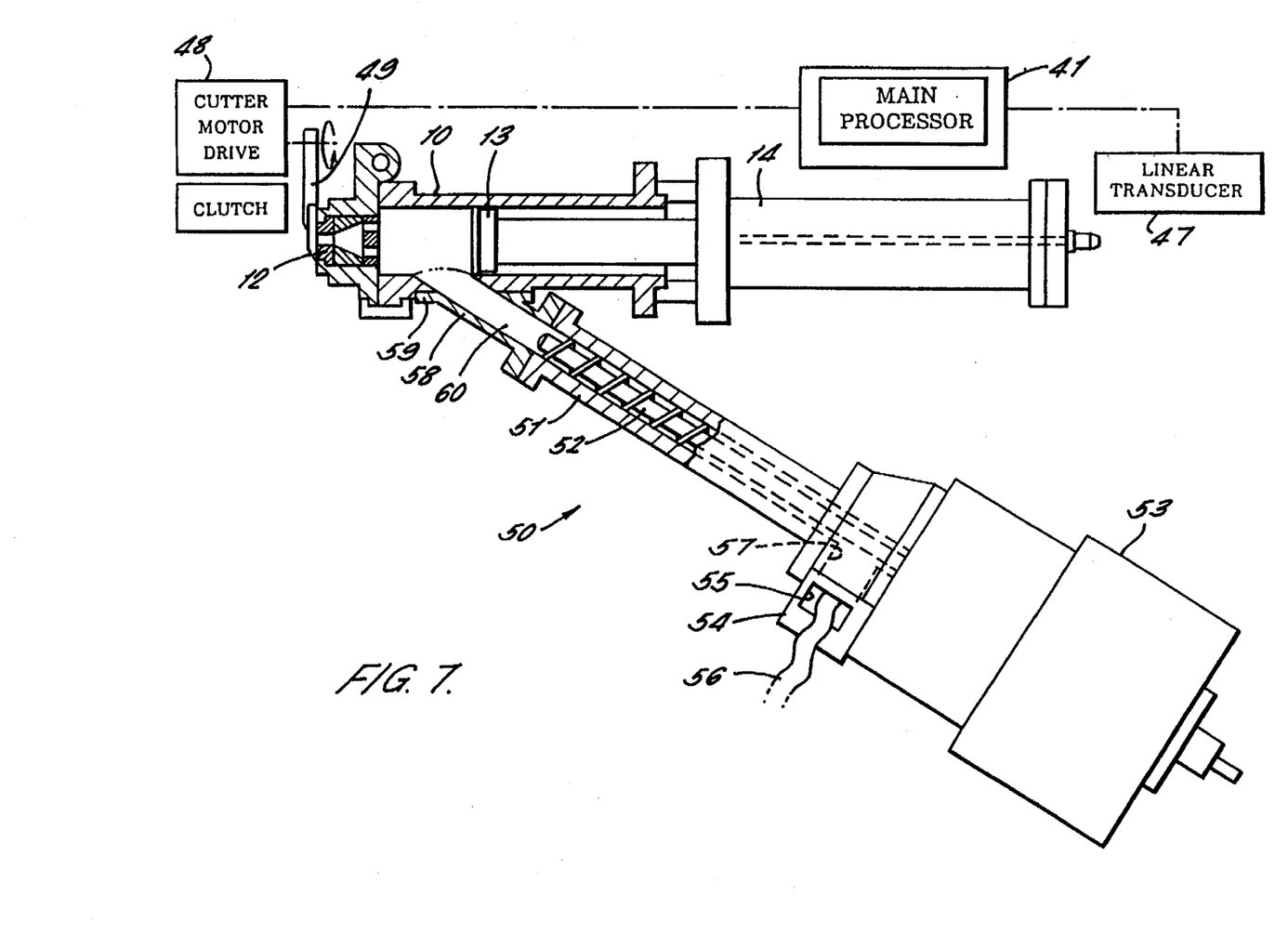
FIG. 7 shows a hydraulic ram extruder in accordance with the present invention fitted with a screw extruder for charging the cylinder of the extruder with material to be extruded.

Reference is now made to FIG. 7 of the drawings which illustrate a further arrangement in which the hydraulic ram extruder has an extrusion cylinder 10 to be charged with rubber or other elastomeric material to be extruded. An extrusion die 12 is mounted at end of the cylinder to extrude the elastomeric material with a required cross-section and a ram 13 projects from a hydraulic cylinder 14 into the other end of the extruder cylinder to pressurise the elastomeric material therein. The hydraulic cylinder 14 is connected in a hydraulic circuit which includes a pump which draws oil from an oil tank and supplies the oil through a fluid line in which a proportional flow valve and differential valve are located to the cylinder 14. The proportional flow valve and differential valve govern the volume flow-rate and pressure of oil to the cylinder to control the rate of advance of the ram to extrude compound from the extrusion cylinder through the die at a substantially constant volume flow-rate.

The cutter for severing the extrudate delivered from the die of the extruder is a rotary cutter driven by a variable speed servo motor 48. The motor has a two-speed clutch which automatically engages "H" or "L" in a gearbox for high and low speed ranges and varying torque. The speed control for the servo motor is controlled by the main processor 41 to vary the cutter speed is required.

The main processor calculates the ram velocity by sensing linear transducer 47 displacement. A control algorithm then synchronises the ram velocity and cutter speed to maintain a given blank weight.

A screw extruder indicated generally at 50 comprises an extrusion barrel 51 containing a flighted screw 52 which is rotated by an electric motor drive and gearbox 53 mounted at one end of the extruder barrel 51. A housing 54 is mounted between the gearbox 53 and extruder barrel 51 and is formed with an inlet port 55 to receive compound strip 56 which may be fed hot or cold to the extruder. A passage 57 extends through the housing from the port to the inlet end of the screw 52.

At the other end of the extruder barrel 51 there is a heated adaptor sleeve 58 having an obliquely inclined end 59 for coupling the screw extruder at an angle to the end of the cylinder 10 of the ram adjacent the die 12. The adapter sleeve 58 provides a feed throat 60 through which the material to be extruded is delivered by the screw extruder into the cylinder of the ram extruder between extruding operations. Filling of the cylinder 10 from the screw extruder is used to push back the piston 13 against the back pressure provided by the hydraulic ram 14. Thus, the cylinder 10 is maintained fully filled with compound at all times as it is recharged from the screw extruder to avoid the creation of any voids in the compound.

Once the cylinder 10 has been filled to the required extent, the screw extruder is switched off and the ram of the ram extruder is advanced to deliver extrudate through the die 12.

The following further points should be noted:

compound strip is fed into the screw extruder; the screw extruder pre-heats and masticates the compound for presentation into the cylinder of the ram extruder;

compound entering the cylinder forces the hydraulic ram to retract from the illustrated forward position to achieve a predetermined prefill volume (when required a rear station die accessory prevent compound issuing from the die due to the prefill action);

the filling action is such that an air free charge is obtained thus eliminating the need for vacuum withdrawal;

when charged, the preformer will switch to extrude in the normal manner;

the compression of compound in the throat area has had no adverse effect on preform accuracy;

with the inclusion of a programmable controller the above method can be totally automated.

Figure 8:
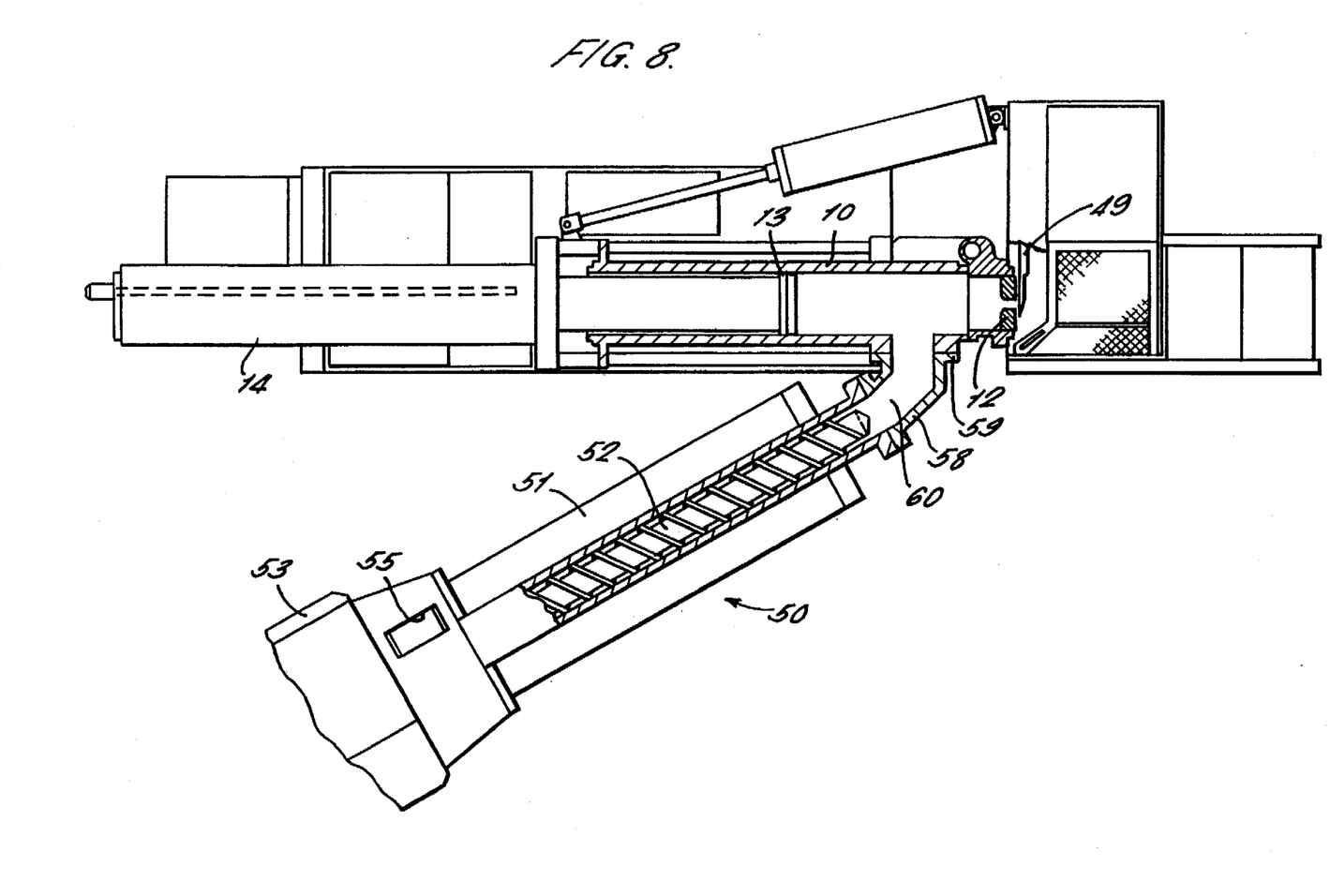
FIG. 8 is a similar view to FIG. 7 showing a further modification.

FIG. 8 of the drawings shows a modification in which the adaptor sleeve 58 is angled to provide an entry 58a into the extruder barrel normal to the barrel rather than at an oblique angle. This makes the component easier to manufacture and the extrusion cylinders easier to clean down.

I claim:

1. In an extruder a method for forming pieces of extrudate of a predetermined volume from extrusion material, said extruder including a cylinder, a ram movably disposed in said cylinder, an extrusion die, and a cutter, said method comprising:

moving said ram in said cylinder to extrude extrudate from said extrusion die;

determining the speed of advance of said ram in said cylinder;

cyclically moving said cutter relative to said die to thereby sever pieces of said extradate; and controlling the speed of said cutter during each individual cycle of the cutter as a function of the speed of advance of said ram to produce individual pieces of extrudate of substantially equal volume.

2. In an extruder a method for forming pieces of extrudate of a predetermined volume from extrusion material, said extruder including a cylinder, a ram movably disposed in said cylinder, an extrusion die, and a cutter, said method comprising:

supplying hydraulic fluid at a constant volume flow rate to said cylinder and thereby moving said ram in said cylinder to extrude extrudate from said extrusion die;

determining the speed of advance of said ram in said cylinder;

substantially continuously rotating said cutter to thereby sever pieces of said extradate; and controlling the speed of said cutter during each revolution of said cutter as a function of the speed of advance of said ram to produce individual pieces of extrudate of substantially equal volume.

3. The method according to claim 1 wherein said cutter rotates around an axis.

4. The method according to claim 1 wherein said ram is moved hydraulically.

5. The method according to claim 3 wherein hydraulic fluid is supplied to said ram at a substantially constant volume flow rate.

6. The method according to claim 1 wherein said cylinder is charged with extrusion material during or between extrusion operations of said ram.

7. In an extruder a method for forming pieces of extrudate of a predetermined volume from extrusion material in an extruder, said extruder including a hydraulic cylinder, a ram movably disposed in said cylinder, an extrusion die, and a cutter, said method comprising:

supplying hydraulic fluid to said ram at a substantially constant volume flow rate and thereby moving said ram in said cylinder to extrude extrudate from said extrusion die;

substantially continuously rotating said cutter to thereby sever pieces of said extrudate;

determining the speed of said ram relative to said cylinder; and controlling the speed of said cutter during each revolution of said cutter as a function of the speed of said ram to produce individual pieces of extrudate of substantially equal volume.

\* \* \* \* \*